United States Patent [19]

Chenot et al.

[11] Patent Number: 4,698,548

[45] Date of Patent: Oct. 6, 1987

[54] LAMP INCORPORATING PHOSPHOR BLEND OF CALCIUM FLUOROPHOSPHATE AND STRONTIUM HALOPHOSPHATE

[75] Inventors: Charles F. Chenot, Towanda, Pa.; Robert E. Taylor, deceased, late of Odessa, N.Y.; by Vincent Chiola, Towanda, Pa., executor; Wolfgang Walter, Brookline, Mass.

[73] Assignee: GTE Products Corporation, Stamford, Conn.

[21] Appl. No.: 925,951

[22] Filed: Mar. 5, 1987

Related U.S. Application Data

[63] Continuation-in-part of Ser. No. 787,815, Oct. 15, 1985, abandoned, which is a continuation of Ser. No. 290,538, Jun. 18, 1981, abandoned, which is a continuation of Ser. No. 830,791, Sep. 6, 1977, abandoned.

[51] Int. Cl.$^4$ .............................................. H01J 61/44
[52] U.S. Cl. ............................ 313/487; 252/301.4 H; 252/301.4 P; 252/301.6 P
[58] Field of Search ................. 252/301.4 P, 301.6 P, 252/301.4 H; 313/487

[56] References Cited

U.S. PATENT DOCUMENTS

| | | | |
|---|---|---|---|
| 2,476,654 | 7/1949 | Froelich | 252/301.4 P |
| 2,488,733 | 11/1949 | McKeag et al. | 252/301.4 P |
| 2,965,786 | 12/1960 | Aia et al. | |
| 3,549,552 | 12/1970 | Broekhoven | 252/301.4 P |
| 3,555,336 | 1/1971 | Koedam | 313/486 |
| 3,670,194 | 6/1972 | Thornton et al. | 252/301.4 P |
| 3,886,396 | 5/1975 | Hammer et al. | 313/486 |
| 4,038,204 | 7/1977 | Wachtel | 252/301.4 P |
| 4,075,532 | 2/1978 | Piper et al. | 252/301.4 P |

FOREIGN PATENT DOCUMENTS 956451 10/1974 Canada .

OTHER PUBLICATIONS

Fonda "J. of the Optical Soc. of America", vol. 40, No. 6, 1950, pp. 347–352.
Botden "Philips. Res. Repts.", 7, 1952, pp. 192, 214, 215.
Walter "Applied Optics", 1971, vol. 10, pp. 1108–1113.
Kruithof "Fluorescent Lamp Lighting" edited by Elenbaas, Chapter III, pp. 31–33, 42–44 (1962).

Primary Examiner—Jack Cooper
Attorney, Agent, or Firm—James Theodosopoulos

[57] ABSTRACT

Calcium fluorophosphate phosphor co-activated by specific levels of antimony and manganese emits in a narrow portion of the yellow region of the spectrum making such phosphor useful in fluorescent lamps. Furthermore, when blended in specific proportions with a blue-emitting divalent europium activated strontium halophosphate, and incorporated into a fluorescent lamp, the resultant lamp gives an increased lumen per watt output over a "cool white" lamp incorporating a standard "cool white" calcium halophosphate phosphor.

3 Claims, 1 Drawing Figure

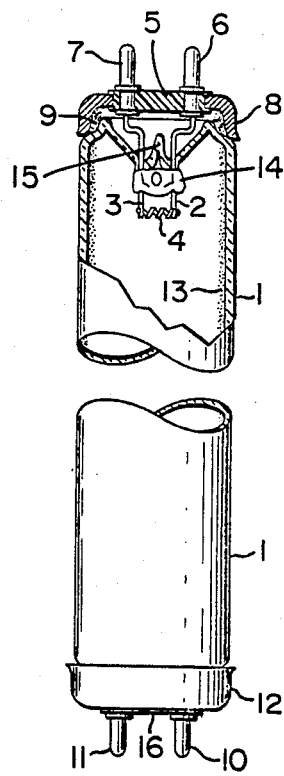

LAMP INCORPORATING PHOSPHOR BLEND OF CALCIUM FLUOROPHOSPHATE AND STRONTIUM HALOPHOSPHATE

This application is a continuation-in-part of Ser. No. 787,815, filed Oct. 15, 1985, which is a continuation of Ser. No. 290,538 filed June 18, 1981 which is a continuation of Ser. No. 830,791 filed Sept. 6, 1977 now abandoned.

FIELD OF THE INVENTION

This invention relates to alkaline earth metal halophosphate phosphors, and more particularly relates to a calcium fluorophosphate phosphor, a blend of this phosphor with a strontium halophosphate phosphor, and to lamps incorporating these phosphors.

PRIOR ART

Recent emphasis on energy conservation and rising fuel costs has caused a demand for more efficiency energy consuming electrical devices, such as fluorescent lamps.

Alkaline earth halophosphate phosphors, when suitably activated, are widely used in fluorscent lamps. In general, the halophosphates are analogous to the naturally occurring mineral apatite $3\ Ca_3(PO_4)_2.Ca(OH)_2$, and can be represented by the formula $3\ M_3(PO_4)_2.\ 1\ M'X_2$, where X represents halogen or a mixture of halogens and M and M' are alkaline earth metals. Such as phosphors may be activated by antimony, bismuth, tin, or lead, any of which may co-activate with manganese, as is disclosed in U.S. Pat. No. 2,488,733, issued to A. H. McKeaq and P. W. Ranby, Nov. 22, 1949.

"Cool white" and "warm white" fluorescent lamps incorporate a calcium halophosphate co-activated by antimony and manganese, wherein the halogen includes chlorine and/or fluorine and the levels of manganese and chlorine are adjusted to give a desired color temperature, typically about 4300° to 4500° K. for "cool white" and about 3000° K. for "warm white". In addition, the phosphor may contain an additive such as cadmium, to increase the efficiency of the phosphor. See U.S. Pat. No. 2,965,786, issued to M. A. Aia and S. M. Poss, Dec. 20, 1960, and assigned to Sylvania Electric Products, Inc.

SUMMARY OF THE INVENTION

In accordance with the invention, a calcium fluorophosphate phosphor co-activated by from about 0.4 to about 1.0 weight percent of antimony and from about 1.7 to about 2.0 weight percent manganese emits in a narrow portion of the yellow region of the spectrum when excited by ultraviolet radiation, making such phosphor useful in fluorescent lamps. Furthermore, the phosphor may be blended with a blue emitting divalent europium activated strontium halophosphate phosphor to give a two-component blend in which the blue component ranges from about 2.9 to about 4.8 weight percent of the total weight of the blend. When incorporated into a fluorescent lamp, the blend results in an increase in lumens per watt output over the output of a standard "cool white" lamp incorporating a standard "cool white" calcium halophosphate phosphor.

In a preferred embodiment, the blend is incorporated into a composite layer in fluorescent lamp as a layer or coating of the phosphor blend over SnO layer or coating on the interior surface of the glass enveloped.

In further preferred embodiment, a layer or coating of $Al_2O_3$ is incorporated into the composite layer between the SnO layer and phosphor blend layer.

BRIEF DESCRIPTION OF THE DRAWING

FIG. 1 is a section view of embodiment of a lamp of the invention incorporating a layer coating the interior surface of the glass envelope, the layer incorporating a phosphor or phosphor blend of the invention.

DETAILED DESCRIPTION OF THE PREFERRED EMBODIMENT

The yellow calcium fluorophosphate is based upon a flouropatite host composition of the type $3M_3(PO_4)_2.\ 1\ M'X_2$, where M and M' are calcium and X is fluorine. The amounts of calcium will vary with manganese content since manganese substitutes for calcium in the lattice.

As is known in the art, cadmium may advantageously be incorporated into the phosphor composition in small amounts in order to improve efficiency, typically within the range of about 0.6 to about 0.9 weight percent.

The blue strontium halophosphate is based upon a haloapatite host composition, having the formula $(Sr_{10-x}Eu_x)Cl_2(PO_4)_6$, where the halogen is chlorine. In addition, the divalent Eu activator, as expressed by X, may range from about 0.02 to about 0.2. The blue phosphor is thus a species of the divalent europium activated alkaline earth halophosphate described and claimed, for example, in Canadian Pat. No. 956,451, issued Oct 22, 1974 to F. F. Mikus and F. N. Shaffer, and assigned to the present assignee.

In FIG. 1, the sealed glass envelope 1 has the lead-in wires 2, 3, sealed through one of its ends and corresponding lead-in wires sealed through the other end. The usual coiled-coil 4 of tungsten wire is supported between, and electrically connected to, the pair of lead-in wires 2, 3, and a similar coil is supported by and connected to the lead-in wires at the other end of the envelope 1. An insulating base piece 5 having contact pins 6 and 7, each pin being connected to one of the lead-in wires, held in the metal cap 8, which is fixed by the cement 9 to one of the envelope 1, and a similar base piece 16, having contact pins 10 and 11, is cemented to the other end by cup 12.

The tungsten coils carry the usual electron-emitting coating of alkaline earth oxides, generally including also a small percentage of zirconium dioxide.

A filling of inert gas such as argon or a mixture of neon and krypton at about 2 millimeters of mercury pressure, and the usual small quantity of mercury is inside the glass envelope 1. The lamp has the usual stem press 14 and sealed exhaust tube 15.

On the inside surface of the envelope, is a layer 13 which in a preferred embodiment is a composite layer comprising a base layer of tin oxide. In practice, this layer may be formed by directing a fine spray of a tin hydroxide slurry against the inside surface of the glass envelope to build up a coating up to several microns in thickness. During a subsequent heat treatment the hydroxide is converted to an oxide of certain desired resistance. This tin oxide layer provides a base upon which the phosphor layer is formed, by conventional techniques. This phosphor layer may incorporate either the yellow phosphor alone or a blend of yellow and blue phosphors, as described above. In addition, it may be described to provide a protective layer of aluminum oxide over the tin oxide layer prior to formation of the phosphor layer. This aluminum oxide layer may be formed, for example, by applying an aluminum oxide agueous slurry to the coating surface, and subsequently drying. The aluminum oxide should be a fine particle size material such as Alon C, a trade name for a powder obtained by a fume reaction of aluminum chloride and water to form a hydroxide, which is subsequently dehydrated by directing the reaction product against a hot surface.

EXAMPLE I

A series of calcium fluoroapatite phosphor compositions activated by Sb and Mn and containing Cd were formulated, wherein the calcium and manganese levels were varied. Table I shows the cation content of these compositions expressed as atomic ratios.

TABLE I

| Sample No. | Ca | F | Mn | Sb | Cd |
|---|---|---|---|---|---|
| 1 | 4.63 | 0.92 | 0.12 | 0.04 | 0.06 |
| 2 | 4.60 | 0.92 | 0.15 | 0.04 | 0.06 |
| 3 | 4.57 | 0.92 | 0.18 | 0.04 | 0.06 |
| 4 | 4.54 | 0.92 | 0.21 | 0.04 | 0.06 |
| 5 | 4.63 | 0.93 | 0.15 | 0.06 | 0.06 |

These compositions were prepared as 350 gram samples from formulated batch compositions of scratching materials. Batch compositions for samples 2 and 3 are presented in Table II and III and include molecular weight, mole ratio and assay (analyzed weight percent of compound on ignition loss) of the starting materials.

TABLE II

| | (Sample II) | | |
|---|---|---|---|
| Starting Material | Mol. Wt. | Ratio | Assay |
| CaHPO$_4$ | 136.10 | 3.00 | 100.00 |
| CaCO$_3$ | 100.09 | 1.14 | 99.60 |
| CaF$_2$ | 78.08 | 0.46 | 99.28 |
| MnCO$_3$ | 54.94* | 0.15 | 45.17* |
| Sb$_2$O$_3$ | 291.50 | 0.02 | 100.00 |
| CdO | 128.41 | 0.06 | 100.00 |

*of metallic manganese

TABLE III

| | (Sample III) | | |
|---|---|---|---|
| Starting Material | Mol. Wt. | Ratio | Assay |
| CaHPO$_4$ | 136.10 | 3.00 | 100.00 |
| CaCO$_3$ | 100.09 | 1.11 | 99.60 |
| CaF$_2$ | 78.08 | 0.46 | 99.28 |
| MnCO$_3$ | 54.94* | 0.18 | 45.17* |
| Sb$_2$O$_3$ | 291.50 | 0.02 | 100.00 |
| CdO | 128.41 | 0.06 | 100.00 |

*of metallic manganese

Batch compositions for sample 5 are presented in Table IV:

| Starting Material | Mol. Wt. | Ratio | Assay |
|---|---|---|---|
| CaHPO$_4$ | 136.10 | 3.00 | 100.00 |
| CaCO$_3$ | 100.09 | 1.163 | 99.70 |
| CaF$_2$ | 78.08 | 0.467 | 99.30 |
| MnCO$_3$ | 54.94* | 0.152 | 44.60 |
| Sb$_2$O$_3$ | 291.50 | 0.03 | 100.00 |
| CdO | 128.41 | 0.06 | 100.00 |

*of metallic manganese

The batches were crucible fired from about 1100° C. to about 1150° C., washed in water and dried. The final fired materials had a Fisher Sub Sieve Size of about 8.5 microns. Upon incorporation into fluorescent lamps, the materials upon UV excitation emitted in the yellow region of the spectrum, with the x and y coordinate values shown below in Table V. These x and y values are the coordinate values which determine the locus point on he standard C.I.E. (Convention Internationale de L'Eclairage) chromaticity diagram.

TABLE V

| Sample No. | x | y | Visual Color |
|---|---|---|---|
| 1 | 368 | 424 | Blue-Green |
| 2 | 383 | 433 | Yellow |
| 3 | 397 | 440 | Yellower |
| 4 | 411 | 449 | Yellowest |
| 5 (FA6) | 405 | 428 | Yellow |

Sample numbers 2, 3, and 5 exhibited yellow emissions within a range determined to be acceptable for fluorescent lamp usage, while samples 1 and 4 did not.

EXAMPLE 2

Sample No. 5 was incorporated into two 35 watt fluorescent lamps of the type depicted FIG. 1 of the Drawing, as a coating over a ZnO coating on the interior surface of the envelope. The lamps were operated for 500 hours, and output in lumens was measured at 0, 100, and 500 hours. Rusults are shown in Table VI below, together with additional testing information.

TABLE VI

| Lamp No. | 0 Hrs. | Watt | 100 Hrs. | Watt | 500 Hrs. | Watt | Weight Coating |
|---|---|---|---|---|---|---|---|
| 1 | 3062 | (35.5) | 2816 | (35.2) | 2683 | (35.9) | ~6.00 |
| 2 | 3048 | (35.9) | 2799 | (35.5) | 2689 | (35.5) | 5.85 |

EXAMPLE 3

Fluorescent lamps of the 35 watt type shown in FIG. 1 were fabricated as in the previous example, except that the phosphor coating was a blend of yellow fluoroapatite of the composition of Sample No. 5 and a blue divalent Eu activated Sr chloroapatite of the composition

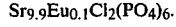

$Sr_{9.9}Eu_{0.1}Cl_2(PO_4)_6$.

As shown in Table IV, the composition of Sample No. 5 was formulated as follows:

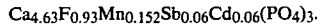

$Ca_{4.63}F_{0.93}Mn_{0.152}Sb_{0.06}Cd_{0.06}(PO_4)_3$.

The lamps were operated for 500 hours. Results are shown in Table VII below, together with additional testing information.

The lumen output of the lamp phosphor blend in the 35 watt lamp may be compared to the lumen output of the standard "Cool White" Ca fluoroapatite phosphor in standard 40 watt lamp. For example, "Cool White" exhibits an initial output of 3200 lumens. Thus, Lamp No. 1 of Table VII exhibits 92% of the initial lumen output of "Cool White" when operated at less than 88 percent of the wattage. Expressed differently, the lamp containing the blend exhibits a light output approaching "Cool White" when operated at more than a 12% savings in energy comsumption.

TABLE VII

| Lamp No. | Wt. % Y | Wt. % B | 0 Hrs. | Watts | 100 Hrs. | Watts | 500 Hrs. | Watts | x | y |
|---|---|---|---|---|---|---|---|---|---|---|
| | | | (Lumen Output and Watts) | | | | | | | |
| 1 | 97.1 | 2.9 | 2974 | 35.5 | 2741 | 35.3 | 2600 | 35.5 | 388 | 398 |
| 2 | 95.2 | 4.8 | 2949 | 35.5 | 2712 | 35.0 | 2612 | 35.3 | 382 | 392 |

What is claimed is:

1. A fluorescent lamp comprising a sealed envelope, a pair of opposing electrodes, a fill of inert gas and mercury, and a phosphor coating on the internal walls of said envelope, said phosphor consisting of 95.2 to 97.1 weight percent of calcium fluorapatite having the formulated composition $$Ca_{4.63}F_{0.93}Mn_{0.152}Sb_{0.06}Cd_{0.06}(PO_4)_3,$$

and 2.9 to 4.8 weight percent $$Sr_{9.9}Eu_{0.1}Cl_2(PO_4)_6$$

divalent europium activated strontium halophosphate, the x and y chromaticity coordinates of the light emission of the lamp being about 0.382–0.388 and 0.392–0.398 respectively, the lumens per watt efficiency of the lamp being greater than that of a lamp utilizing a standard cool white calcium fluoroapatite phosphor.

2. A fluorescent lamp comprising a sealed envelope, a pair of opposing electrodes, a fill of inert gas and mercury, and a phosphor coating on the internal walls of said envelope, said phosphor consisting of 97.1 weight percent calcium fluoroapatite having the formulated composition $$Ca_{4.63}F_{0.93}Mn_{0.152}Sb_{0.06}Cd_{0.06}(PO_4)_3,$$

and 2.9 weight percent $$Sr_{9.9}Eu_{0.1}Cl_2(PO_4)_6$$

divalent europium activated strontium halophosphate, the x and y chromaticity coordinates of the light emission of the lamp being 0.388 and 0.398 respectively, the lumens per watt efficiency of the lamp being greater than that of a lamp utilizing a standard cool white calcium fluoroapatite phosphor.

3. A fluorescent lamp comprising a sealed envelope, a pair of opposing electrodes, a fill of inert gas and mercury, and a phosphor coating on the internal walls of said envelope, said phosphor consisting of 95.2 weight percent calcium fluoroapatite having the formulated composition $$Ca_{4.63}F_{0.93}Mn_{0.152}Sb_{0.06}Cd_{0.06}(PO_4)_3$$

and 4.8 weight percent $$Sr_{9.9}Eu_{0.1}Cl_2(PO_4)_6$$

divalent europium activated strontium halophosphate, the x and y chromaticity coordinates of the light emission of the lamp being 0.382 and 0.392 respectively, the lumens per watt efficiency of the lamp being greater than that of a lamp utilizing a standard cool white calcium fluoroapatite phosphor.

* * * * *